United States Patent
Segredo

[15] 3,654,752
[45] Apr. 11, 1972

[54] MULTIPLE ROW FORAGE HARVESTER

[72] Inventor: John D. Segredo, Chicago, Ill.

[73] Assignee: International Harvester Company, Chicago, Ill.

[22] Filed: Feb. 18, 1970

[21] Appl. No.: 12,213

[52] U.S. Cl. ..............................................56/98
[51] Int. Cl. ......................................A01d 45/02
[58] Field of Search..............56/14.3, 98, 105, 106, 119

[56] References Cited

UNITED STATES PATENTS

| | | | |
|---|---|---|---|
| 3,352,093 | 11/1967 | Procter | 56/98 |
| 3,375,646 | 5/1968 | Dion | 56/98 |

Primary Examiner—Russell R. Kinsey
Assistant Examiner—J. A. Oliff
Attorney—Noel G. Artman and Floyd B. Harman

[57] ABSTRACT

A multiple row forage harvester having at least one center gathering divider and side gathering dividers forming a plurality of gathering passages including a pair of side gathering passages, with gathering chains on opposite sides of each gathering passage, the side gathering passages having rear portions inclined laterally inwardly toward each other, the gathering chains on the outer sides of the side gathering passages following the direction of those passages and being made up of a plurality of corresponding sections, including a forward one at an angle closer to the foreward direction of travel and a rearward one at a greater angle thereto.

15 Claims, 8 Drawing Figures

PATENTED APR 11 1972 3,654,752

Inventor:
John D. Segredo
By John J. Kowalik
Atty.

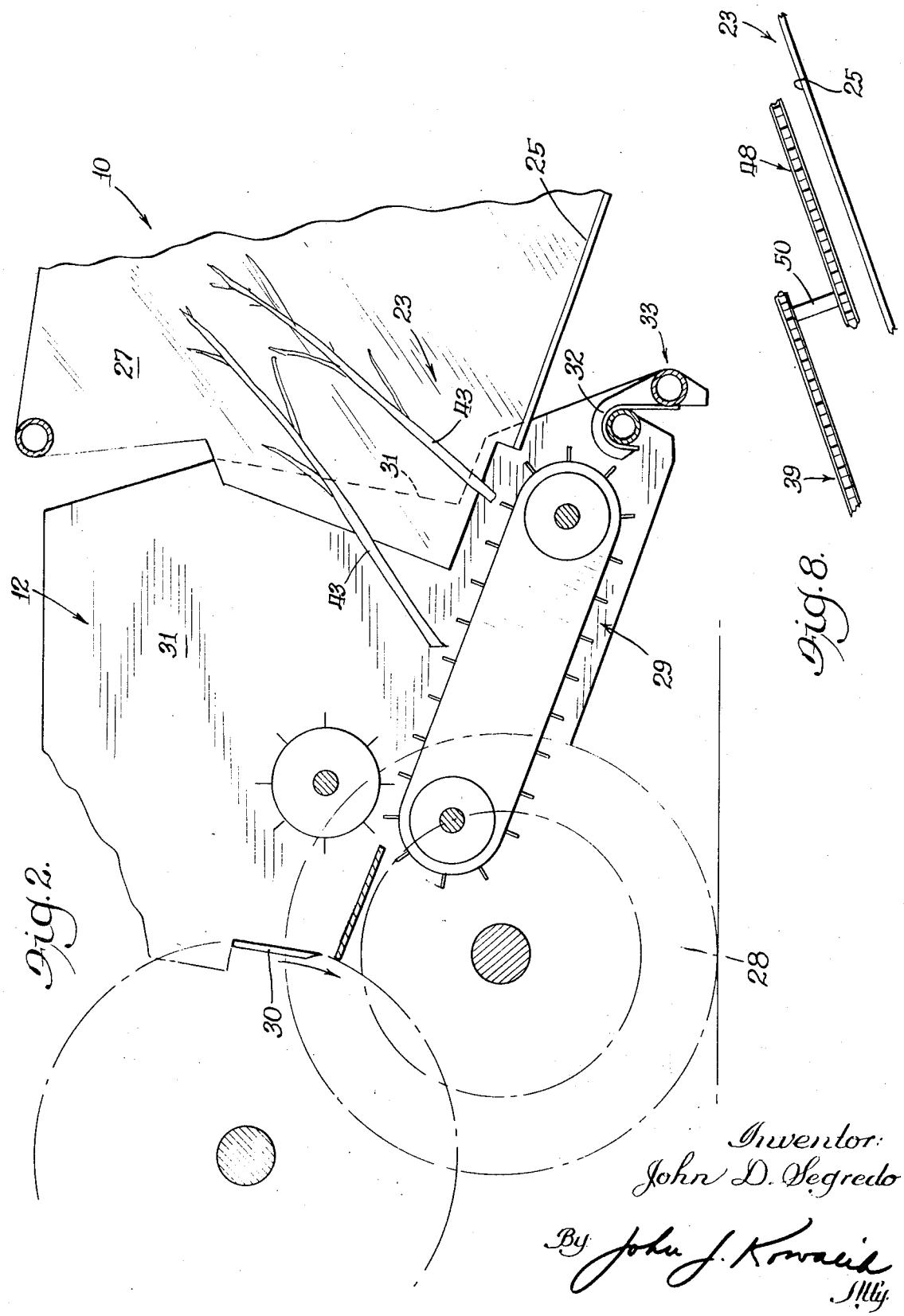

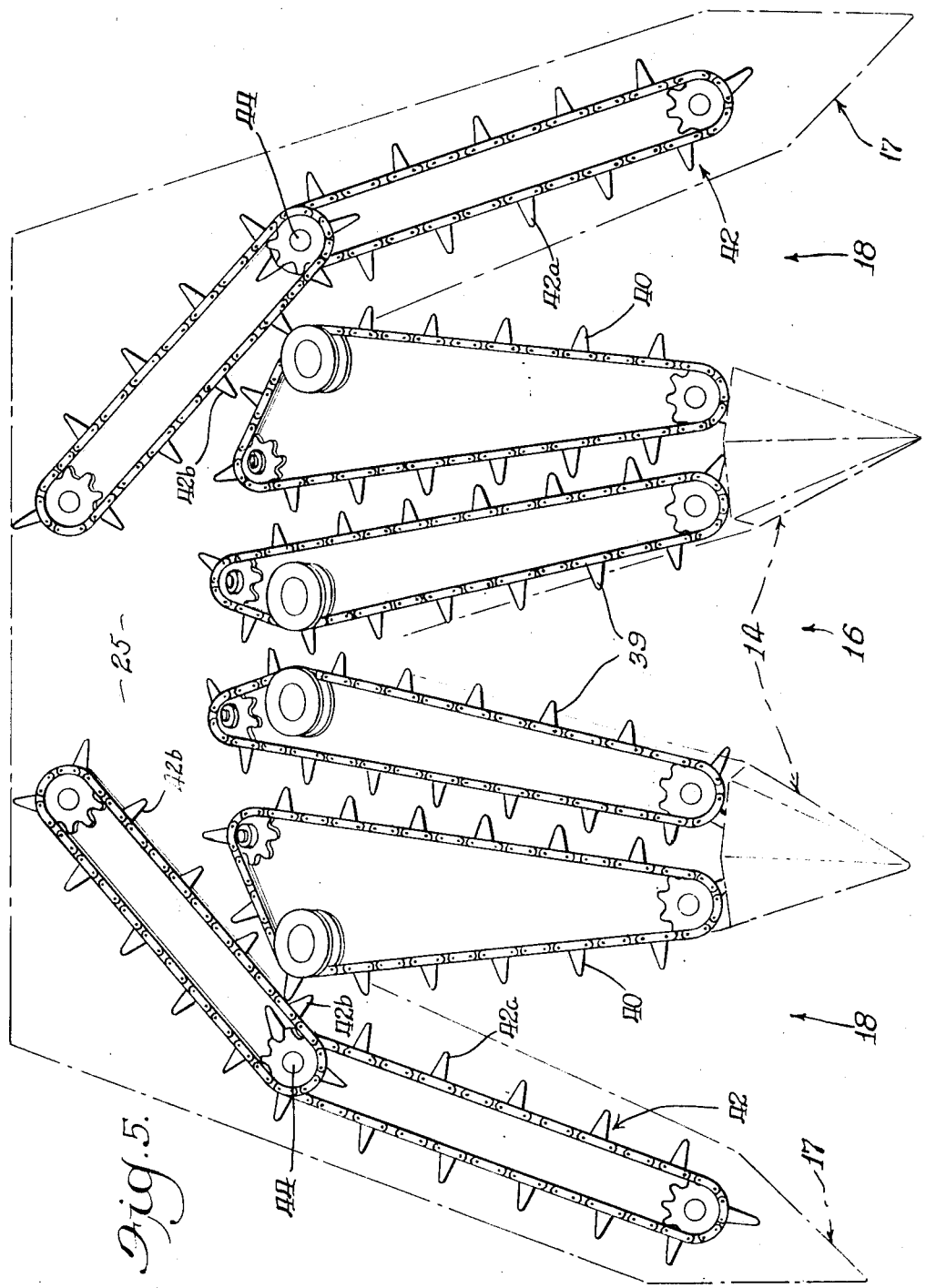

Inventor:
John D. Segredo
By John J. Kowalik, Atty.

MULTIPLE ROW FORAGE HARVESTER

FIELD OF THE INVENTION

A forage harvester to which the present invention is applicable is particularly adapted for harvesting row crops, such as corn. Usually accompanying the harvester is a supplementary trailing component such as a cutter, which in itself is of certain predetermined size and particularly of a certain width. As the harvester cuts the corn stalks and conveys them rearwardly it confines them laterally for accommodating the trailing component.

A forage harvester must be of a certain minimum length in order to effectively gather the stalks and confine them laterally, and that the gathering passages do not converge too abruptly. This phenomenon is most pronounced in the case of multiple rows, and the greater number of rows accommodated by the harvester, the greater is the problem of so confining the stalks.

OBJECTS OF THE INVENTION

A broad object of the invention is to provide a multiple row forage harvester of novel construction particularly effective for accommodating multiple rows of forage crops and effective for gathering them and greatly confining them laterally for accommodating a trailing component of substantially lesser width.

Another object is to provide a multiple row forage harvester of the foregoing character having at least one center gathering divider, and side gathering dividers, forming a plurality of gathering passages for a corresponding plurality of rows, in which the side gathering dividers are arranged for accommodating widely spaced standing rows and capable of gathering the stalks of those rows into narrow lateral confines.

A further object is to provide a multiple row forage harvester of the foregoing character including side gathering dividers having a component of direction close to the longitudinal for effectively accommodating the crop rows, and also including conveying means for confining and conveying the crop stalks laterally inwardly within a certain predetermined narrow range.

A further object is to provide a forage harvester of the kind just referred to in which the side gathering dividers have forward portions extending close to the forward direction of travel for accommodating the standing rows, and rearward portions more inclined thereto for confining the cut stalks laterally inwardly within the desired lateral range for accommodating a trailing implement.

Still another object is to provide a forage harvester of the character just referred to, and including gathering chains on opposite sides of each gathering passage, and wherein the gathering chains in the side gathering passages, on the outer sides of the side gathering dividers, are each made up of a plurality of sections including a forward section at a small angle to the forward direction of travel and a rearward section at a greater angle thereto, and including means for cutting the stalks at a point adjacent the juncture of the sections, whereby the forward sections are operative for gathering the stalks in standing position with a minimum of lateral deflection, and the rearward sections are operative, after the stalks are cut, for further gathering and deflecting them laterally inwardly within the desired relatively narrow limits for accommodating a trailing implement such as a cutter.

A still further object is to provide a forage harvester of the foregoing character, which also includes additional conveyor means in a novel arrangement for conveying the cut crop stalks butt-end-first through the forage harvester to the trailing implement.

DESCRIPTION OF A PREFERRED EMBODIMENT OF THE INVENTION

FIG. 2 is a fragmentary side view, semi-diagrammatic in nature, showing a portion of the forage harvester and the trailing or following component on which it is mounted;

FIG. 5 is a view oriented according to FIG. 3, showing the individual upper gathering chains in detail and the outline of the frame structure in dot-dash lines;

FIG. 8 is a semi-diagrammatic view taken at line 8—8 of FIG. 3 but showing principally the gathering chains.

Figure 1:
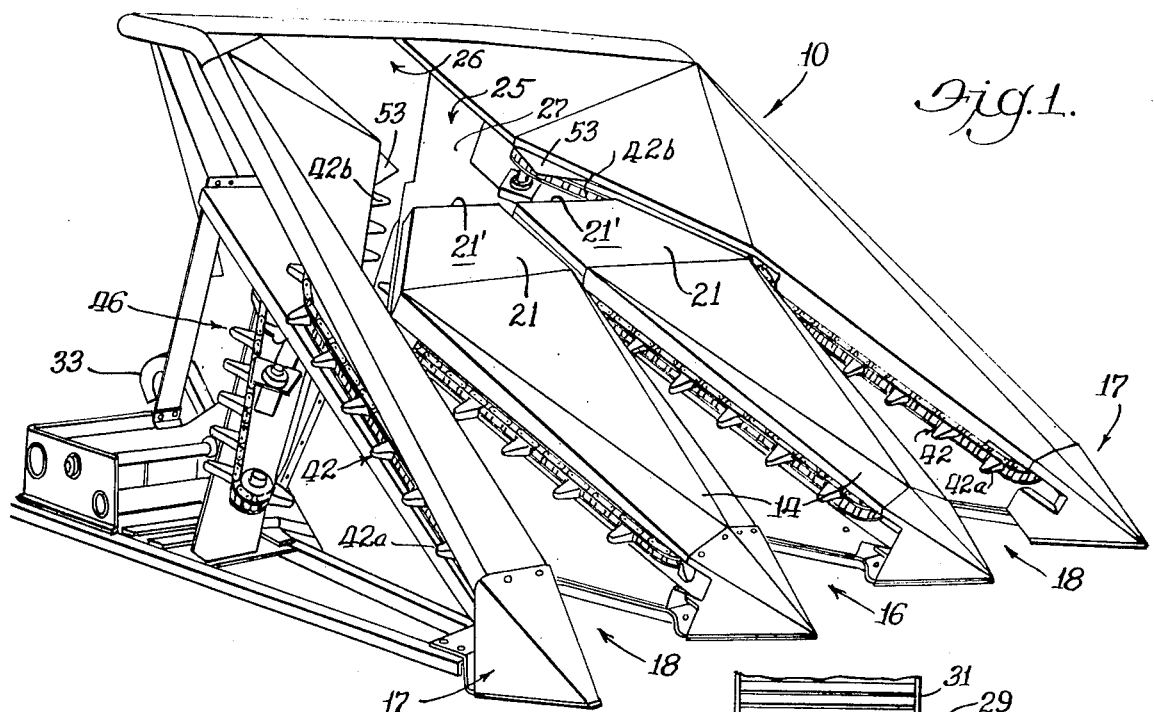
FIG. 1 is a perspective view of a forage harvester incorporating the features of the present invention.

Referring in detail to the accompanying drawings, a forage harvester or harvesting component or unit is indicated generally at 10, embodying the features of the invention. This forage harvester is of a type generally known in that it includes gathering dividers defining certain gathering passages for receiving the stalks of a corresponding number of rows, and means for cutting the stalks and conveying them rearwardly into a trailing component or implement such as a cutter or chopper here indicated at 12. It is believed unnecessary to describe the details of construction of the harvester to the extent that it is similar to other harvesters, and the details of construction thereof incorporating the features of the present invention will be referred to specifically hereinbelow.

The forage harvester 10 in the present instance is a three-row harvester, having a pair of center gathering dividers 14 defining a center gathering passage 16, and a pair of side gathering dividers 17 defining, with the adjacent center gathering dividers, side gathering passages 18. The harvester, symmetrical about a longitudinal center line 19, presents an overall upper surface inclined upwardly rearwardly.

The center dividers 14 form forward extensions of units 20 being effectively "islands" of the frame, having fore portions 21 inclined similarly to the upper surface of the frame, and rear downwardly inclined portions 21'. The portions 21' together form a table over which at times, the upper ones of a big mass of cut stalks may slide in the movement of the stalks to the rear. The side gathering dividers 17 form extensions of side portions 22 of the main frame and rearwardly therebetween is a rear central area 23 having a platform 25 (FIGS. 3 and 6) which extends forwardly under a portion of the gathering passages, as will be referred to again hereinbelow. The platform 25 is also inclined upwardly rearwardly substantially at the inclination of the upper gathering chains 39, 40, 42. A rear opening 26 is provided in the frame through which the stalks 43 (FIG. 2) are conveyed, butt-end-first into the trailing component. Side walls 27 define the sides of the area 25 and they extend rearwardly for cooperation with the trailing component 12 (see below).

The component 12 in itself may be of known construction. In this instance it is a cutter and supports and carries the forage harvester, as indicated, and includes ground engaging wheels 28, and a conveyor 29, preferably of the slat type, receiving the stalks from the forage harvester and conveying them rearwardly over a plate into a cutter drum where they are cut by knives 30. The conveyor 29 is bounded by side plates 31 and laterally spaced supporting elements 32. The forage harvester is provided with hooks 33 which fit over the supporting elements 32, and these together with a pair of other connection (not shown) support the forage harvester. In so mounting the forage harvester, the rear edge of the plate 25 is positioned slightly above and to the rear of the front end of the conveyor, and the plates 27 are telescoped within the side plates 31. The stalks are then conveyed, actually pushed, through the opening 26 into the trailing or following component or implement 12 as indicated above.

The gathering passages 16, 18 converge rearwardly as will be understood, leading to constricted throats 34, 35; the central passage 16 continues rearwardly in a narrow passage portion 36 which lets out in the rear central area 23; similarly to side gathering passages 18 continue in reduced dimension passage portions 37, inclined laterally inwardly toward each other and continuing rearwardly and also letting out in the central area 23. A suitable cutting means such as a transversely reciprocating sickle 38 is provided at the throats 34, 35 and includes a central portion 38a in the central passage 16 and side portions 38b in the side passages 18. The platform 25, as indicated above, extends forwardly under the narrow passage portions 36 and 37 to a position adjacent the sickle for receiving the stalks immediately after being cut for supporting them when they are conveyed rearwardly. The platform is inclined upwardly rearwardly similarly to the front portions of the gathering dividers which form the overall upper surface of the harvester.

Figure 3:
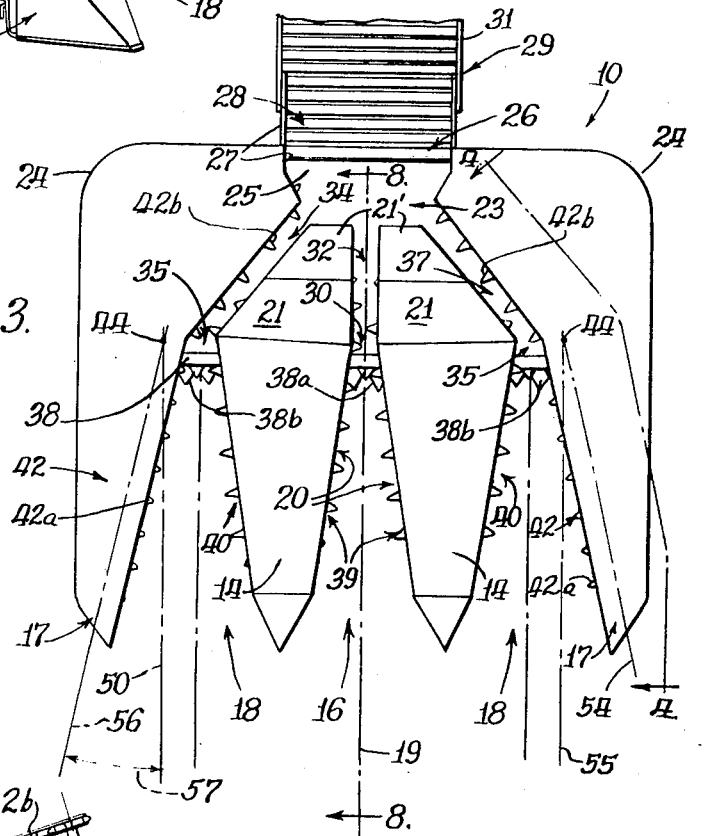
FIG. 3 is a plan view of the forage harvester generally perpendicular to the overall sloping top as presented in FIG. 1, omitting various details and showing only the principal portions embodying the features of the present invention.

Upper gathering chains are provided on both sides of each passage as shown best in FIGS. 3 and 5, FIG. 5 showing the specific arrangement of each of the chains. These chains, which are inclined upwardly rearwardly in accordance with the overall upper surface of the harvester, (see FIG. 4) include a first pair 39 on opposite sides of the central passage 16, a second pair 40 on the inner sides of the side passages 18, and a third pair 42 on the outer sides of the side passages. Each outer chain 42 is made up of a forward section 42a and a rearward section 42b, which do not continue in a straight line but are disposed at an angle to each other. The convergence of the passages 16, 18 is different from that employed in harvesters heretofore known, in that the side passages 18 are more nearly in a line with the corresponding plant rows; the inclination of the forward chain sections 42a is at a relatively small angle to the forward direction of movement, or the longitudinal, while the lateral inclination of the rearward chain sections 42b, disposed in the passage portions 37, is at a greater angle. The two sections have adjacent ends with a common axis 44 (FIG. 4) both for convenience in driving and for providing linear continuity therebetween. The rear section 42b is of lateral inclination similar to the opposite side of the passage portion 37. Preferably the chain section 42a continue rearwardly at least to the throats 35 and the sections 42b continue into or at least adjacent the rear central area 23. The other chains 39, 40 may continue rearwardly a desired amount, preferably beyond the throats 34, 35 but need not continue rearwardly entirely into the central area 23.

Figure 4:
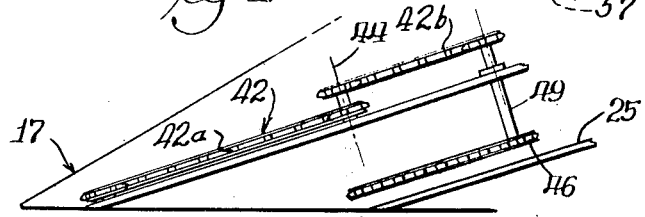
FIG. 4 is a semi-diagrammatic view oriented according to line 4—4 of FIG. 3, showing principally the corresponding gathering chains, and certain other elements, but omitting details.
Figure 6:
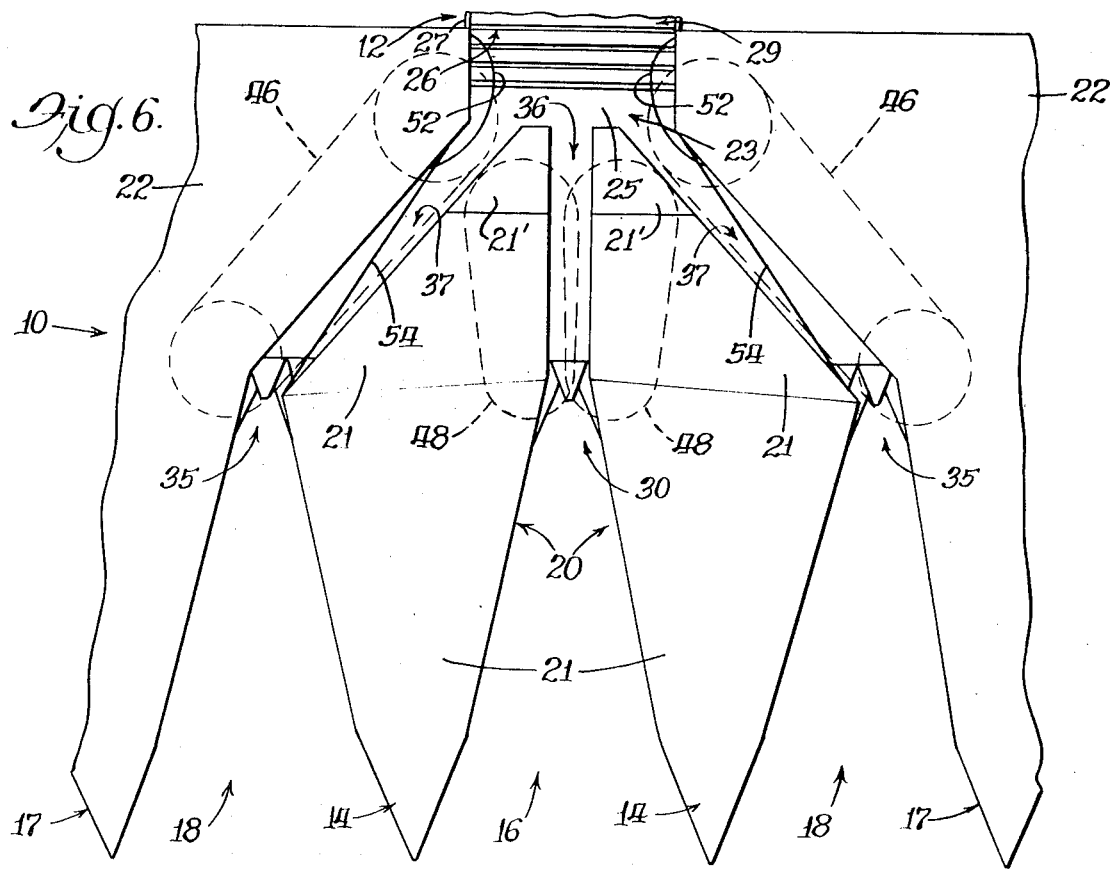
FIG. 6 is a semi-diagrammatic view oriented according to FIG. 3, but showing the lower conveyor chains in dot-dash lines.
Figure 7:
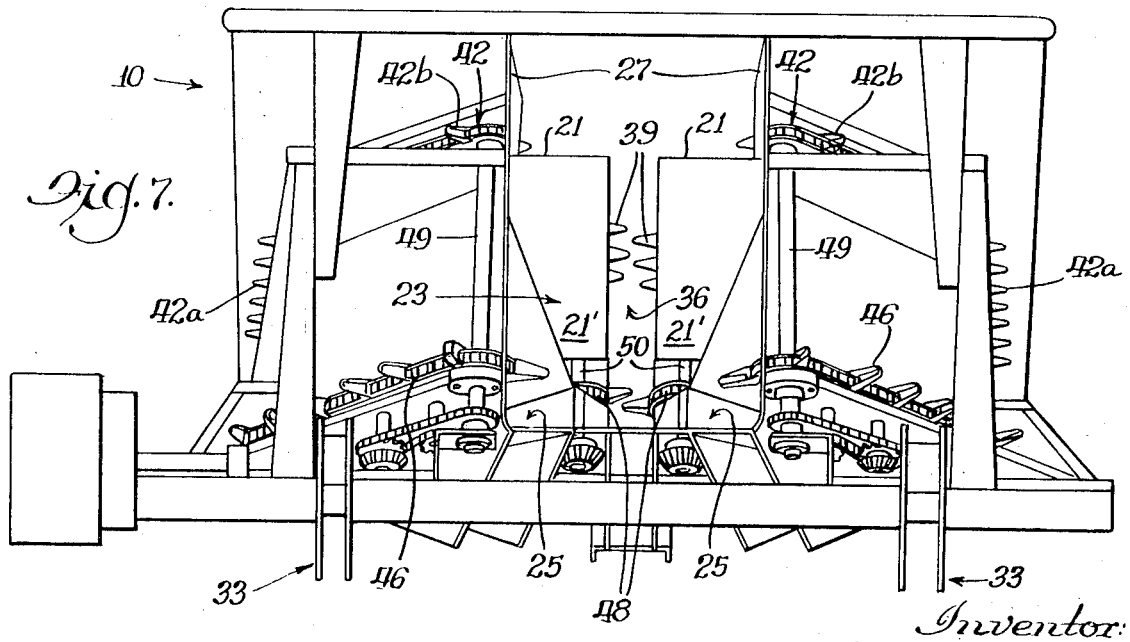
FIG. 7 is a rear perspective view of the harvester.

In addition to the upper gathering chains 39, 40, 42 referred to, the harvester is provided with lower gathering chains 46, 48, FIGS. 6 and 7 showing the lateral location of these chains, the dot-dash lines in FIG. 6 representing the paths of the outer tips of the teeth thereof, while FIGS. 4 and 8 show the vertical location thereof. The chains 46 are parallel to and spaced below the sections 42b of the upper chains, being inclined upwardly rearwardly, and laterally inwardly, similarly thereto, and of substantially the same length, reaching from a point ahead of the throats 35 rearwardly into the rear central area 23. The chains 48 are spaced below the chains 39 and inclined upwardly rearwardly similarly thereto. They reach from a point ahead of the throat 34 rearwardly to a position closely adjacent the rear central area 23. Their inner opposed runs extend straight rearwardly, forming effective continuation of the upper chains 39, but at a lower level (see FIG. 7). The lower gathering chains 46, 48 are driven at a greater linear rate than the upper gathering chains, and are positioned above the platform 25. All of the gathering chains are mounted and driven in a known manner, and by known means such as shafts 49 (FIG. 7) driving the chains 46, 42, and shafts 51 driving the chains 48, 39.

Chain strippers 52 are provided in the passages 37 in association with the lower gathering chains 46 (FIG. 6) and similar strippers 53 in association with the upper chains 42b (FIGS. 1 and 3), while one or more pressure straps 54 (FIG. 6) are provided in each passage, biasing the cut stalks against the lower and upper gathering chains. The harvester is provided with any suitable drive means of known kind for driving the gathering chains and the sickle and it is believed that specific description of this means is unnecessary.

The gathering chains 39, 40 and the forward chain sections 42a work on the stalks in standing position and hence one chain on each side of each passage is sufficient for proper conveyance of the stalks. In the case of the side gathering passages 18, after the stalks are cut by the sickle and pass thereby into the narrow passages 37, the vertically spaced chains, i.e., 46 and 42b together are found effective without chains on the opposed sides of those passages in view of the greater lateral inclination of the passages, the reaction against the chains being provided by the pressure straps 54, and by the opposite sides of the passages. In the case of the center gathering passage 16, the stalks after being cut and passing into the passage 36 are engaged by the lower chains 48, and there being two of them opposed to each other, it is not necessary to provide chains spaced vertically thereabove, although there is a degree of overlapping at the front end of the lower chains 48 and the rear end of the chains 39. The mass of stalks passing through the passage 16 force or push those ahead of them, through the narrow passage, rendering it unnecessary to provide upper chains in register with the lower chains, the absence of any such lower chains enabling the rear table 21' to be inclined downwardly in rearward direction.

The lower gathering chains 46, 48, having greater linear speed than the upper gathering chains, 39, 40, 42, tilt the cut stalks 43 so that their butt ends lead rearwardly (FIG. 2). The stalks move through the passages and are of such quantity that they spill from the passages and roll or slide onto the table 21' and form a total mass as to extend continuously between the chain sections 42b and further form a compact mass between the side walls 27 in the rear central area 23. The upwardly rearwardly sloping direction of the platform 25 aids in directing the stalks in butt-end-first movement, in which they exit through the opening 26 onto the conveyor 29 and thus into the implement 12, as referred to above.

FIG. 3 shows lines 55 in the side gathering passages 18 extending in the direction of forward movement, or longitudinally, and through the axis 44 between the chain sections 42a, 42b. These lines serve as a reference to the angle of the forward chain sections 42a as represented by the lines 56 also passing through the axes 44. The angle 57 between these lines represents the degree which the forward chain section 42a is displaced from the longitudinal. As will be seen, this angle is small, and is determined by the desired spacing between the side gathering dividers 17 and the corresponding center gathering dividers 14 which in turn is determined by the spacing of the standing rows with which the harvester is to be utilized. The construction and the design is such that the gathering dividers, and particularly the side gathering dividers 18, are relatively long as compared with the spacing of the rows, to effect a close approximation of straight rearward conveyance of the crop stalks. The overall design and construction of the forage harvester is such that particular machines may be predesigned, easily and inexpensively, to accommodate the desired number of rows, and rows of different spacings, by locating the forward chain sections 42a at the desired angle corresponding to the spacing of the rows.

A forage harvester of the general character disclosed herein, in the general operation of harvesting, forms one unit of a series operative for an overall harvesting operation, including for example the unit or cutter 12 and additional implements as well. In the direction of efficiency, it is desired that as great capacity as possible and practicable be achieved. Heretofore the capacity of the forage harvester itself has been limited, more so than the accompanying implements such as the cutter 12, due at least partially to the fact that the forage harvester is limited in the number of standing rows of stalks that can be accommodated, the rows being spaced according to other considerations, such as the capacity of the ground. There is a minimum limit to spacing of the rows, and it would be impracticable if not impossible to provide a harvester according to previous design that would accommodate a greater number of rows necessary to provide a total mass of stalks that could be accommodated by the accompanying components.

As an example of the embodiment of the foregoing in a practical instrumentality, the forage harvester can be made of the necessary width to accommodate three rows, and as so constructed the side gathering dividers 17 are spaced apart a great width relative to the rear outlet opening 26 which is in proportion to the associated components or implements, and of a width designed in that connection for forage harvesters that were much narrower as heretofore made. However the side gathering dividers 17 and the forward chain sections 42a therein, are disposed at a relatively small angle to the forward directions of movement or the longitudinal, to engage the stalks while they are still standing and convey them rearwardly substantially without excessive lateral displacement. In other words the angle of the forward chain sections 42a is s similar to the opposed sides of the passages, and at a substantially lesser angle than that of forage harvesters heretofore known. These side passages 18 are spaced apart at a great distance, to so accommodate relative straight rearward longitudinal movement of the stalks. This wide spacing of the rows and the mass of stalks therein heretofore could not practically be handled and controlled to convey and move them laterally inwardly from such a wide spacing, of for example three rows, into a small and confined central area or space as 23. A harvester of previously known design, made of dimensions capable of accommodating three rows, would necessarily be too short longitudinally, or too stubby, with the standing stalks being conveyed at an abrupt angle laterally inwardly, with consequent excessive bending of the stalks and stripping the corn therefrom and leaving a long stalk, or pulling them from the ground. In the present instance the stalks are substantially upright when cut by the sickle, the greater inclined chain sections 42b carrying the stalks in a substantially upright when cut by the stance abruptly inwardly, which they are capable of doing, and in an efficient manner. The runs 42b vertically overlap the forward edge of the conveyor 29 and thus delivery is positive from runs 42b and a positive purchase is made by the conveyor after release by the gathering chains. This insures a smooth, unhesitant movement of the material from the initial engagement of the crop by the machine to its discharge into the cutter component.

I claim:

1. A forage harvester for harvesting standing plant stalks, gathering dividers forming a plurality of gathering passages including a pair of side gathering passages and a center gathering passage positioned between said side gathering passages, the harvester having a narrow rear opening of a width substantially less than the spacing between the side gathering passages, the gathering passages having fore portions that are substantially straight and disposed at a relatively small angle in the direction of movement of the harvester and converging rearwardly, sickle means at the rear ends of said fore portions, means conveying the standing stalks rearwardly in the fore portions of the gathering passages and comprising means along the sides of each passage conveying the stalks in the gathering passages to respective portions of said sickle means and said side passages having aft portions with sides positioned at an abrupt angle to the direction of movement, and conveying means along the sides of the aft portions having a common transfer connection with the conveying means in said respective fore portions for conveying the material after it is cut abruptly laterally inwardly toward and through said narrow rear opening.

2. A wide span forage harvester for harvesting a plurality of rows of standing crops without excessively bending them laterally while attached to the ground comprising a harvesting component having a rear central area and a plurality of gathering dividers including one center gathering divider and a pair of side gathering dividers defining a plurality of gathering passages between adjacent ones thereof and forming a pair of side gathering passages and a center gathering passage positioned between said side gathering passages, gathering chains on opposite sides of each gathering passage and including outermost ones of such gathering chains on outermost sides of the side gathering passages, said outermost chains including forward portions adjacent to the direction of travel of the harvester and rearward portions inclined laterally inwardly toward each other relative to the forward portions, means mounting adjacent ends of the forward and rear chain portions on a common axis, the gathering chains all being effective for confining crop stalks and moving them rearwardly and the rearward portions of said outermost gathering chains also moving the stalks of the corresponding rows laterally inwardly, all into said rear central area having a lateral extent substantially less than the maximum transverse range of the gathering passages.

3. A forage harvester according to claim 2 wherein the rear central area has a lateral extent less than that between the center lines of said side gathering passages.

4. A forage harvester according to claim 2 wherein the forward portions of said outermost gathering chains are inclined inwardly rearwardly at a small angle to the direction of movement of the harvester.

5. A forage harvester according to claim 4 wherein the forward and rearward portions of each of said outermost gathering chains are independent endless chain sections, and the endless chain sections have said common axis as their axis of rotation at the juncture thereof.

6. A forage harvester according to claim 2 wherein each gathering passage converges rearwardly into respectively constricted throats, sickle means is provided at the throats, and the rearward sections of said outermost gathering chains extend laterally inwardly from the throats and sickle means.

7. A forage harvester according to claim 6 wherein the convergence of the gathering passages terminates adjacent the throats and the gathering passages continue rearwardly therebeyond at substantially uniform widths.

8. A forage harvester according to claim 7 wherein the rearward portions of the gathering passages beyond the throats are of no greater width than the rearmost extremity of the converging forward portions of the passages.

9. A forage harvester according to claim 5 and including sickle means at the rear end of the forward chain portions, and lower gathering chains positioned rearwardly adjacent to, spaced vertically from, and generally parallel to the rearward portions.

10. A forage harvester according to claim 9 wherein the lower gathering chains are disposed below said rearward chain portions, and including means for driving the lower gathering chains linearly faster than the upper gathering chains.

11. A forage harvester according to claim 6 and including lower gathering chains below said rearward portions and also extending generally rearwardly from the throats and sickle means and substantially to said rear central area in direct discharge relation to a trailing component.

12. A forage harvester according to claim 6 wherein the harvester includes inner gathering chains extending rearwardly to adjacent throats and sickle means, and additionally includes lower gathering chains below said inner gathering chains extending rearwardly substantially to said rear central area.

13. A forage harvester according to claim 5 wherein the rearward chain portions extend rearwardly into said rear central area.

14. A forage harvester according to claim 13 wherein lower gathering chains extend rearwardly substantially the extent of the rearward chain portions.

15. A forage harvester comprising, a plurality of gathering dividers defining a pair of outer gathering passages and a center gathering passage positioned between said side gathering passages, the harvester also including a rear central area of substantially less width than the maximum transverse range of the series of gathering passages, the gathering passages each converging rearwardly to a constricted throat and having a rear portion continuing rearwardly therebeyond and letting out into said rear central area, the rear portion of the center gathering passage continuing substantially straight rearwardly and the rear portions of the side gathering passages being inclined laterally toward each other rearwardly, gathering chains on opposite sides of each gathering passage and those on the outer sides of the converging portions of the outer gathering passages being inclined at only a small angle relative to the direction of movement of the harvester and the outer sides of the rear portions of the outer gathering passages being inclined at an angle relative to the direction of movement of the harvester greater than said small angle, the gathering chains on the outer sides of the outer gathering passages each including a forward and a rearward endless chain section forming continuous chain means and continuing along such outer sides of those gathering passages at the same respective inclinations as the front and rear portions of the latter, the front sections of the outer gathering chains continuing rearwardly to the respective throats and terminating shortly therebeyond, the rear sections of the outer gathering chains continuing throughout the rear portions of the outer gathering passages and substantially into said rear central area, and the remaining gathering chains continuing rearwardly to the respective throats and terminating shortly therebeyond, and means providing a common axis of rotation at the juncture of said forward and rearward chain sections.

* * * * *